Figure 1:
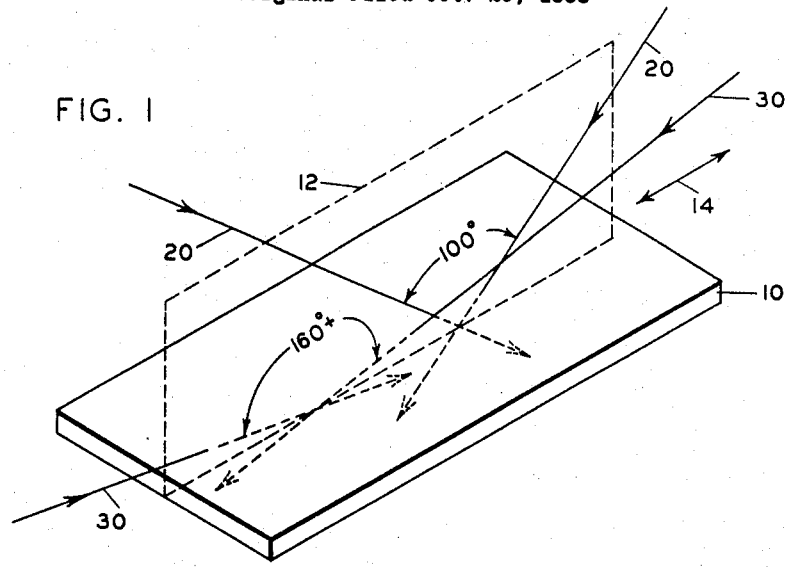

Aug. 31, 1943.   E. H. LAND   2,328,219
LIGHT POLARIZER AND PROCESS OF MANUFACTURE
Original Filed Oct. 29, 1938

Edwin H. Land
INVENTOR.

BY Donald L. Brown
Attorney

Patented Aug. 31, 1943

2,328,219

UNITED STATES PATENT OFFICE 2,328,219

LIGHT POLARIZER AND PROCESS OF MANUFACTURE

Edwin H. Land, Cambridge, Mass., assignor to Polaroid Corporation, Cambridge, Mass., a corporation of Delaware Original application October 29, 1938, Serial No. 237,783. Divided and this application January 8, 1943, Serial No. 471,753

25 Claims. (Cl. 88—65)

This invention relates to a new and improved process of making light-polarizing material and to the product thereof.

This application is a division of my copending application, Serial No. 237,783, filed October 29, 1938.

It is one object of the present invention to provide a new process for making dichroic, light-polarizing sheet plastic material.

Another object is to provide a process for the manufacture of a light-polarizing sheet wherein a sheet of a rubbery-elastic plastic material is extended to substantially the limit of the rubber-elastic state to orient the molecules thereof and is set or held in said extended condition, and wherein at one stage thereof said sheet is dyed or stained to render it dichroic.

Further objects are to provide a process as outlined above which is particularly applicable to transparent, linear, high polymeric plastic materials and especially to materials of this class whose molecules contain hydroxyl groups, such for example as regenerated cellulose and vinyl compounds such as vinyl acetal; to provide such a process which will be applicable to materials of this class which are inherently rubbery-elastic; and to provide such a process wherein a plastic sheet of the above class is rendered rubbery-elastic, as by heating or swelling, and is then extended, set and rendered dichroic as outlined above.

A still further object is to provide a new and improved light-polarizing sheet plastic material which is the product of the novel process of the present invention, and more specifically a sheet of a transparent, linear, high polymeric plastic material which has a dichroic substance incorporated therewith, and which is under substantially uniform, internal, linear stress or strain but which will contract when said stress or strain is released.

Another object is to provide dichroic light-polarizing material in the form of a sheet of a molecularly oriented, transparent, linear, high polymeric plastic having incorporated therewith a dichroic substance such, for example, as a dichroic dye or stain.

Further objects are to provide such a light-polarizing sheet having a dichroic ratio in excess of 15 and capable of absorbing upwards of 98% of the undesired component of light incident thereon; to provide such a light-polarizing sheet wherein the directions of monochroism within the sheet make angles with each other in excess of 160°; to provide such a light-polarizing sheet wherein the ratio of the tensile strength in the direction of one of the dichroic axes to the tensile strength in the direction of the other dichroic axis is a measurable maximum; and to provide such a light-polarizing sheet showing maximum birefringence over those regions of the spectrum where it shows relatively low dichroism.

Still further objects are to provide a light-polarizing sheet having the above characteristics which comprises a cellulosic plastic, such for example as cellulose acetate or regenerated cellulose; to provide such a light-polarizing sheet which comprises a vinyl compound, such for example as a vinyl acetal resin; to provide such a sheet wherein the dichroic substance comprises an element, and more specifically iodine, bromine, or a metal or semi-metal; to provide such a sheet wherein the dichroic substance comprises a direct cotton dye; and to provide such a light-polarizing sheet laminated between protective layers of glass or some suitable relatively hard transparent plastic.

Other objects of the invention will in part be obvious and will in part appear hereinafter.

The invention accordingly comprises the several steps and the relation of one or more of such steps with respect to each of the others, and the article possessing the features, properties, and the relation of elements which are exemplified in the following detailed disclosure, and the scope of the application of which will be indicated in the claims.

Figure 2:
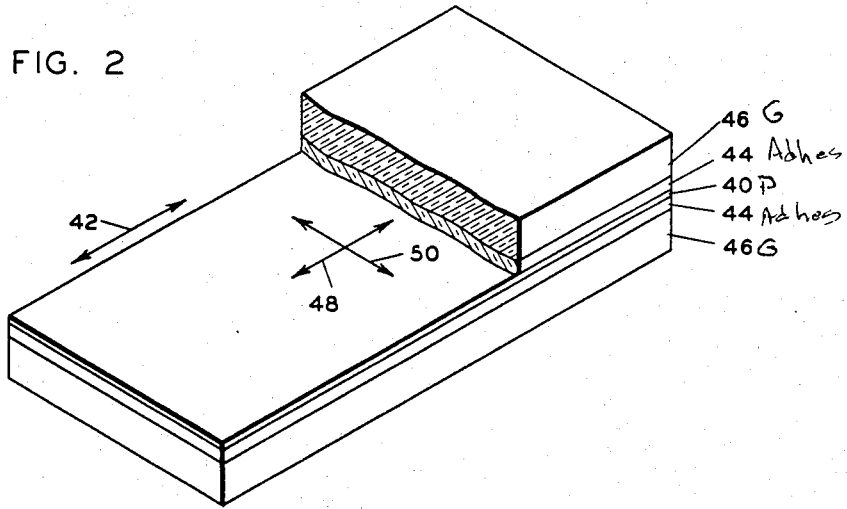

For a fuller understanding of the invention, reference should be had to the accompanying drawing, in which:

Figure 1 is a diagrammatic view in perspective showing a polarizer prepared in accordance with the present invention and illustrating in connection therewith the directions of monochroism; and Figure 2 is a diagrammatic view in perspective, partly cut away, showing a lamination embodying a polarizer prepared in accordance with the present invention.

There has heretofore been developed a light-polarizing sheet sold commercially under the trade name "Polaroid" which comprises a suspension of oriented, needle-shaped, light-polarizing particles in a light-transmitting plastic. The polarizing properties of this type of polarizer arise from the suspended crystalline particles. The plastic suspending medium serves essentially as a carrier and positioner of the polarizing particles.

Other forms of synthetic light polarizers have been suggested. It has, for example, been suggested that a polarizer be formed by building up a deposit of oriented polarizing crystalline areas on a suitable transparent support. It has also been suggested that a polarizer might be obtained by flowing on to a normally anisotropic surface or a surface rendered anisotropic, as by rubbing, a solution of a dye. In each of these two forms the polarizer comprises a transparent support on which there is a deposit in the one case of oriented polarizing crystals and in the other case of a dye. In the latter case the polarizing properties of the combination possibly arise from the anisotropy of the support and its effect upon the deposited dye. In neither of these two forms is the polarizing crystal or the dye incorporated in the supporting sheet or plate, and hence polarizers of this type are easily destroyed unless the polarizing surface is protected by an additional overlying transparent element.

This invention contemplates the provision of a different type of polarizer. In a preferred embodiment of the present invention, a sheet of a plastic material, such for example as a sheet of a cellulosic compound, such as cellulose acetate or ethyl cellulose, or regenerated cellulose of the type sold commercially under the trade name "Cellophane," or a sheet of a vinyl compound, such for example as a vinyl acetal resin sold commercially as "Vinal," or other plastic, is rendered rubber-elastic, and while in this state is stretched or otherwise extended substantially to the limit of its rubber-elastic state. This results in orienting the molecules of the sheet in substantial parallelism in the direction of extension, and the sheet is then either held in the stretched, extended position, or is set so that the deformation set up therein is retained. It will be understood, however, that in the preferred product of the invention, the sheet will tend to contract or return to its original shape or form if the internal stress or strain is released, as will be explained in more detail hereinafter.

At some stage of the process of the invention, for example after the sheet has been stretched or before it has been stretched, the sheet is dyed, either by a suitable dye, such as a direct cotton dye or a suitable mordant dye, or by iodine or bromine or a metal, such as mercury, silver, gold, copper, arsenic, bismuth, antimony, selenium, tellurium or the like. The resulting dyed sheet is found to possess high dichroism, in some cases over predetermined bands of wavelengths in the visible spectrum, and in other cases over substantially the entire range of the visible spectrum.

In its highly dichroic state, the preferred embodiment of the present invention shows substantially no birefringence over those portions of the spectrum in which it shows high dichroism, and over other portions of the spectrum, i. e., those in which it shows substantially no dichroism, the polarizer of the present invention is noticeably birefringent. It may also, in certain cases, show both dichroism and birefringence over certain portions of the spectrum, or even, in certain instances, little birefringence in any portion of the spectrum.

In the extended state previously described, the product of the present invention is so highly dichroic throughout at least a predetermined wavelength band, that the dichroism of the sheet cannot be increased appreciably by further extension in any direction. Furthermore, and presumably because of the extension to which the sheet has been subjected, the ratio of the tensile strength of the sheet in the direction of one of its dichroic axes to the tensile stretch of the sheet in the direction of its other dichroic axis is a maximum.

The preferred embodiment of the present invention is a sheet or film which is substantially uniaxial, and the molecules of which are oriented in substantial parallelism in the plane of the surface thereof. Such a sheet or film 10 is shown in Fig. 1, wherein arrow 14 represents the direction of extension of the sheet. If such a dichroic polarizer, for example a dichroic Cellophane, is examined from points in a plane normal to its surface and including the direction of extension of the sheet, such for example as the plane indicated by dotted lines 12 in Fig. 1, there will be two directions in which the sheet may be viewed and in which it will appear to be monochroic. These directions make equal but opposite angles with a normal to the surface of the sheet. These directions may be termed the directions of monochroism and are represented by arrows 20 and 30 in Fig. 1. For commercial dyed Cellophane, these directions are found to make angles with each other within the sheet of from approximately 90° to approximately 105°, as is indicated by arrows 20. For dichroic polarizing Cellophane of the type embodying the present invention, the directions of monochroism make with each other angles approximating 180° and preferably, in any event, in excess of 160°, as is indicated by arrows 30.

In addition to the aforesaid tests for determining whether the product of the present invention has reached its desired state, it should be noted that in the preferred state the product of the present invention shows substantially no polarized light interference effects throughout that portion of the spectrum in which it is highly dichroic, and the product of the preferred embodiment of the invention will transmit an incident beam of plane-polarized light vibrating in a direction at any angle to the dichroic axes of the sheet substantially free from any elliptical component.

The product of the present invention in its preferred form will transmit substantially more than 75% of one component of the incident beam within the wavelength band for which the product is dichroic, and will transmit substantially less than 2% of the other component of the incident beam. That is to say, said product will have a density for the transmitted component of less than .12 and a density for the absorbed component of more than 1.70 and will accordingly have a dichroic ratio ranging upwards from approximately 15.

The product of the present invention is accordingly to be distinguished from the earlier types of polarizers already discussed by one or more of the properties previously mentioned.

In one form of the invention a sheet of regenerated cellulose, such for example as a sheet of the material sold under the trade name "Cellophane," is stained or dyed with either iodine, bromine, a metal, or a direct cotton dye, for example such cotton dyes as National Erie Black GXOO, Amanil Black, Amanil Fast Black, Tintex Black, and Tintex Purple, or a mordant dye such as logwood. It is to be understood that many cotton dyes may be employed.

If the sheet of Cellophane is stained before being processed as hereinafter described, some degree of dichroism is generally to be noticed.

This dichroism is, however, slight, and unprocessed dyed sheets of Cellophane are not considered suitable for use as polarizers generally.

To dye or stain the Cellophane sheet with iodine, a solution may be made by dissolving, for example 2½ grams of potassium iodide in 30 grams of a saturated solution of zinc chloride. The Cellophane sheet may then be soaked in the solution until it is thoroughly wetted, care being taken, however, to see that the sheet does not rot or dissolve. Excess liquid may then be wiped from the sheet and the sheet subjected to the action of iodine vapor, at or slightly above room temperature, until it has become well stained, as for example a dark, reddish brown. At this stage of the process the sheet shows dichroism, as was previously indicated, but not such marked dichroism as is desired. If, while the sheet is still moist, it is stretched or extended, for example, in warm air, at a temperature slightly in excess of 100° C., care being taken not to burn out the iodine stain, the dichroism it displays becomes noticeably greater than in its unstretched state.

It should be noted that the dye or stain imparted to the sheet is fugitive to moisture. It is therefore desirable to protect the sheet from contact with moisture, for example by laminating it between sheets of glass or other plastic sheets. This lamination may be accomplished by the use of an adhesive comprising a vinylic compound, for example vinyl acetate plasticized with dibutyl phthalate. Such a lamination is shown in Fig. 2, wherein element 40 represents the dyed polarizing plastic which has been stretched in the direction of arrow 42 to the limits of its rubber-elastic state and bonded between glass plates 46 by means of adhesive layers 44. Arrows 48 and 50 represent the dichroic axes of polarizer 40. It will be noted that arrow 48 is parallel to arrow 42 and substantially perpendicular to arrow 50. Generally speaking, with such a polarizer the light transmitted will be vibrating parallel to arrow 50, the light vibrating parallel to arrow 48 being absorbed within the sheet.

In the foregoing process either the potassium iodide or the zinc chloride may be omitted from the imbibing solution. The results obtained are, however, generally inferior to those obtained if the process described is followed. Similarly, sheets of Cellophane may be treated by bromine in the manner previously described in connection with the iodine treatment. Under such circumstances potassium bromide may be substituted for the potassium iodide, and bromine vapor for iodine vapor. Bromine gives an efficient polarizer throughout the blue.

As has already been indicated, the Cellophane sheets may be treated with cotton dyes. The dyeing may be carried out in an aqueous solution. An intense stain can be imparted to the Cellophane with slightly concentrated solutions of the dyes and with dyeing temperatures near the boiling point. For example, in a solution of 15 grams of Tintex Black per quart of water, an intense stain can be secured under the conditions mentioned in a few seconds.

It will be understood that the dichroism imparted by the dye depends upon the dye selected, and by selecting different dyes, dichroism throughout predetermined ranges of wavelengths in the visible spectrum may be obtained. By the use of black dyes, dichroism throughout substantially the entire wavelength band in the visible spectrum can be secured. By the use of mixed dyes, dichroism throughout different wavelength bands may be secured. So also dichroic stains may be obtained in Cellophane sheets by staining or dyeing with metals, for example the metals previously described.

The dichroism of the stained or dyed sheet is substantially improved by treating the sheet in the following manner: The Cellophane sheet may be immersed in a swelling agent, such for example as a solution in water of sodium hydroxide and methanol, and more specifically a 5% solution of sodium hydroxide in equal parts of water and methanol. The sheet should remain in the solution until it has been thoroughly wetted, but should be removed before it has rotted or dissolved. When so wetted or swollen, it is found to be in a rubber-elastic state and the stretch imparted to it by extending the sheet may be substantially greater than that imparted to a sheet which has not been similarly treated.

The swollen or wetted sheet is preferably stretched substantially to the limit of extension of its rubber-elastic state. In this condition its dichroism is a maximum, and one dichroic axis coincides with the direction of stretch or extension. The sheet may be held in this condition by suitable holding means or by laminating the sheet to suitable supports, as for example in the manner shown in Fig. 2, or the swelling agent may be rinsed from the sheet, for example by means of a water rinse or a dilute acid bath, while the sheet is being held in stretched condition. When the swelling agent is removed the sheet remains set. It will, however, usually return to its unstretched condition if it is re-wetted or re-swollen with the swelling agent.

It should be noted that in the manufacture of sheets of regenerated cellulose the sheet may be formed by extrusion of a mixture of the cellulosic material and a swelling agent, and the extruded sheet may be passed into a fixing bath for the removal of the swelling agent. Under these circumstances if the extruded sheet is stretched as it is fed into the bath and held in stretched condition while the swelling agent is removed, a product which when dyed is suitable for use in the present invention may be obtained.

It will be understood that the treatment described may be employed either before the sheet is dyed or after it has been dyed. It will be apparent that treatment of the sheet after dyeing can only be carried out if the swelling and wetting agents do not attack the dye or stain. In this connection it should be pointed out that a Cellophane sheet stained with iodine may not be subjected to the wetting treatment previously described after the sheet has been stained, as the iodine stain is fugitive in aqueous media. The Cellophane sheet may, however, be after-treated with the wetting or swelling agent if it has been dyed with some cotton dyes.

In every case the extension of the treated sheet should preferably be substantially to the limit of its rubber-elastic stretch. Generally speaking, this means that the sheet should be extended substantially to, but just below, the point where it ruptures. This, however, is not a completely satisfactory test, for in many cases the plastic sheet will not rupture even if extended beyond the limit of its rubber-elastic state. This state and the preferred degree of extension, as heretofore described, is more particularly defined hereinafter.

Cetain of the cellulosic plastics, and more particularly sheets of plasticized cellulose acetate, may be rendered rubber-elastic by heating the sheet, care being taken, however, not to heat the sheet to a point where it freely flows. The condition desired is not a condition generally termed "thermoplastic," but is more accurately a softening of the sheet without flow, so that it may be more readily stretched. The desired stretch is in every case an elastic stretch, i. e., the sheet should tend to return to its initial shape and form, or substantially thereto, when the stretch is released, the other conditions remaining constant. Under certain conditions a stretch beyond the rubber-elastic limit of the sheet will still leave a product with a limited rubber-elastic stretch, but the sheet will have become permanently deformed so that release of the stretch will not result in a return of the sheet substantially to its initial form. The sheet in its new form may, however, still be said to have a rubber-elastic state, and in that state it may be subjected to the type of stretch here desired.

As an example of the vinyl compounds which may be employed in the present invention, reference will be made to the vinyl oxy compounds such, for example, as a vinyl acetal resin, that is to say, a resin of the class formed from polyvinyl acetate by the successive or combined steps of hydrolysis and condensation with an aldehyde or ketone. Materials of the latter class which have been found particularly suitable include those sold commercially under the trade name "Vinal" and "Vinylite X," which may be taken as illustrative of materials which are preferred for the purposes of the invention. Commercial Vinal usually contains a swelling agent and may properly be said to be in the rubber-elastic state in the form in which it is marketed.

Highly dichroic sheets of vinyl acetal resin may be obtained in any of the following ways: 10 grams of the resin may be dissolved in 50 cc. of butanol. To this may be added 2 cc. of a 20% solution of ammonium iodide in cellosolve and 1.7 cc. of a 20% solution of iodine in butanol. The mix may be cast on a glass plate and dried to a deep green color. Strip from the plate and stretch the sheet and hold it in stretched condition until substantially free of solvent. High temperatures should be avoided.

Another method of treatment is to saturate xyline with ammonium iodide and iodine and immerse therein a sheet of vinyl acetal resin until the sheet is deeply stained. The xyline solution swells but does not dissolve the resin. The vinyl sheet should then be removed from the solution and stretched and then dried while being held in the stretched condition.

Another method is to take a sheet of Vinal and expose the sheet to warm iodine fumes until it has been stained an orange-yellow. When the sheet is stretched, marked dichroism will be apparent. The same condition arises if the stretched, untreated sheet has been dyed with a direct cotton dye.

Other methods of dyeing the resin sheet are to prepare a concentrated solution of the dye, for example Amanil Black WD, in a 50–50 solution of water and denatured alcohol with a little soap added, and imbibe the sheet, for example the vinyl butyral sold as "Vinylite X," in the solution. When the sheet has been stained it is stretched and dried. Or a solution of the vinyl compound in methanol may be dyed with a similar dye and a film cast on glass. When nearly dry this is stripped from the glass, stretched and dried in a stretched condition.

Many other light-polarizing sheets or films embodying the invention may be produced. For example, a sheet of regenerated cellulose such as Cellophane may be dyed with a metal. Very excellent results are obtained where such a sheet is rendered rubber-elastic, stretched to the limit of its rubber-elastic state, and then dyed with mercury. If such a stretched sheet is imbibed in an aqueous solution of a salt of mercury containing oxygen, such for example as mercuric or mercurous nitrate, or mercuric acetate, or mercurous sulphate, and the sheet then heated until the salt has been reduced to metallic mercury, a highly efficient light polarizer is obtained. The sheet may be dyed with the mercury either before or after stretching, but best results are usually obtained if the dyeing succeeds the stretching. A sheet of cellulose acetate similarly treated gives good results.

In the above example, the salt of mercury may be reduced by means of a chemical reducing agent, if desired, such for example as sodium hydrosulphite or paraphenylene diamine. Moreover, if a wet sheet of Cellophane is exposed to mercury vapor and then stretched, or if a stretched and wetted sheet is exposed to mercury vapor, a satisfactory polarizer may be obtained, i. e., the sheet may be directly dyed by the metallic vapor.

Speaking generally, sheets of the plastic materials previously described may be dyed by imbibing the sheets in solutions of a reducible metallic salt and by then reducing the salt to a metal and stretching the sheets to the limit of their rubber-elastic state. The stretch may take place either before or after the reduction of the salt. The reduction of the salt may be accomplished generally by the use of a chemical reducing agent, such as sodium hydrosulphite. Light-polarizing sheets have been produced in this manner by the use of copper sulphate, silver nitrate, gold chloride, arsenious acid anhydride, antimony potassium tartrate, bismuth subnitrate, selenious acid, stannous chloride, nickelous sulphate, tellurous acid, and other metallic salts.

Under certain circumstances special treatments are to be preferred. If, for example, it is desired to employ platinum as the metallic dye, a preferred treatment comprises dyeing the sheet with a solution of equal parts of potassium chloroplatinite, ferric oxalate and ferric chlorate. The sheet is then exposed to ultra-violet radiation and then treated with potassium oxalate.

If it is desired to dye with palladium, a satisfactory product may be secured by using the Baker palladium sensitizing set and dyeing the plastic sheet with the mixture intended for strong prints. The sheet is then exposed to ultra-violet radiation and reduced with potassium oxalate.

If bismuth is to be employed as the metallic dye, a stretched sheet of Cellophane, for example, may be imbibed in a solution of bismuth subnitrate in dilute hydrochloric acid. The sheet is then dried and wiped with a concentrated solution of hydrazine hydrate. The bismuth is reduced in about a day. The reduction should preferably not be accelerated by employing heat.

It is to be understood that the present invention contemplates the use of metals in the processes indicated, whether the reduction be to the metal or to a metallic sulphide.

In addition to the dyes previously mentioned as suitable, attention might be called to the following as indicative of many dyes which may be suitably employed: Niagara Blue (2B), Solantine Red (8BL), Niagara Navy Blue (BW), Erie Green (MT), Erie Garnet (RB), Solantine Black (L), and Purple (Diamond).

As has been previously indicated, mixtures of dyes may be employed. A mixture, for example, of Niagara Blue and Solantine Red, or a mixture of Erie Green and its complementary dye Erie Garnet, when used in the process of the present invention, gives a polarizer which polarizes substantially throughout the entire visible spectrum. The latter polarizer, i. e., that made from a mixture of complementary dyes Erie Green and Erie Garnet, is a transparent neutral gray in color. A black dye, such for example as Erie Black, may be added to the mixture if desired. The processes previously described are suitable for use with all the dyes mentioned, and it is to be understood that many other dyes may be similarly employed.

Under certain circumstances the treatment of the plastic sheet, such as the sheet of Cellophane, to render it rubber-elastic may be modified if desired. A solution of 100 grams of sodium hydroxide in 500 cc. of water may be prepared and cooled, and to this may be added 300 cc. of methanol and 250 cc. of acetone. The Cellophane may be soaked in the solution for from five to ten minutes, and it may then be stretched to the limit of its rubber-elastic state and heated to about 90° C. It may then be washed in dilute sulphuric acid and thereafter in water.

The various treatments specified above are understood to be illustrative merely and not exclusive. Many other plastics than those specified may be employed, and many other dyes or stains may be used. This invention contemplates the use of all such dyes and stains and all such plastics as when employed together give a product which may be rendered rubber-elastic, either by heating or by swelling, or otherwise, and which when stretched to the limit of its rubber-elastic state, shows marked dichroism throughout at least a portion of the visible spectrum.

The specific materials which have been specified above as suitable for use in connection with the present invention are all linear high polymers, and they all have molecules containing strongly polar groups, that is to say, groups which render the molecules dipolar. Transparent plastic materials of this class are highly desirable in the practice of the present invention. Furthermore, it appears that the best results are obtained with such plastics as have molecules containing polar groups comprising hydroxyl groups, and the latter class of plastics are accordingly to be preferred in the practice of the invention.

Glass or other vitreous material is not to be deemed within the term "plastic" as used herein, but that term is intended to include regenerated cellulose.

The term "dyeing" as used herein is intended to include imparting to a material the property of absorbing certain frequencies of light by adding thereto another substance. It is intended to include such treatment where the added substance is an element, or a metallic compound, or a stain, or a non-metallic dye.

The term "rubber-elastic state" as used herein is intended to describe an elastic condition which is closely similar to the elasticity possessed by vulcanized or cured rubber. It is intended to describe a condition in which the plastic may be stretched or extended an appreciable amount without permanent distortion or alteration in the structure of the sheet. Hence it is intended to describe a condition such that when the stress or strain is relieved the sheet tends to return to its original form and shape. It is intended to describe such a condition where that condition is inherent in the material, for example in Vinal, or is acquired by the material when it is in a heated condition, for example vinyl acetal resin, or when it has been subjected to a swelling or wetting agent, for example Cellophane wetted with an aqueous solution of sodium hydroxide.

The term "dichroism" is used herein and in the claims as meaning the property of differential absorption of the components of an incident beam of light, depending upon the vibration directions of said components. By "dichroic substance" is meant a substance whose molecules possess the property of showing dichroism. In the practice of the invention, this property is displayed when said substance is incorporated in a molecularly oriented transparent plastic material, in that the resulting stained areas show dichroism.

It will be apparent from the foregoing description that the preferred products of the process of the present invention may readily be distinguished in that they are in a state of substantially uniform, internal, linear stress or strain and in that they will tend to contract in a direction substantially parallel to the direction of said stress or strain if the latter is released, as for example by heating or treatment with a swelling agent. Referring, therefore, to Fig. 1, the direction of stress or strain in sheet 10 is towards the ends thereof as represented by the heads of arrow 14. If said stress or strain is released, said sheet will contract in a direction substantially parallel to the original direction of strain, i. e., parallel to arrow 14 but in the opposite direction to the heads thereof.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A light polarizer comprising a sheet of material from the class consisting of the transparent vinyl compounds, the molecules of said sheet being substantially oriented, said sheet having a dichroic substance from the class consisting of the stains and dyes incorporated therewith.

2. A light polarizer comprising a sheet of material from the class consisting of the transparent vinyl compounds, said sheet having a dichroic substance from the class consisting of the stains and dyes incorporated therewith and having its molecules so oriented that the angle between the directions of monochroism within said sheet is greater than 165°.

3. A light polarizer comprising a sheet of material from the class consisting of the transparent vinyl compounds, said sheet having a dichroic substance from the class consisting of the stains and dyes incorporated therewith and having its molecules so oriented that the dichroic ratio of said sheet for the wavelengths of light for which it is dichroic is at least 9.

4. A light polarizer comprising a sheet of material from the class consisting of the transparent vinyl compounds, said sheet having a dichroic substance from the class consisting of the stains and dyes incorporated therewith and having its molecules so oriented that the dichroic ratio of said sheet for the wavelengths of light for which it is dichroic is at least 9, said sheet absorbing at least 98% of one component of incident light of said wavelengths.

5. A light polarizer comprising a sheet of material from the class consisting of the transparent vinyl compounds, the molecules of said sheet being substantially oriented, said sheet having a dichroic substance from the class consisting of the stains and dyes comprising an element incorporated therewith.

6. A light polarizer comprising a sheet of material from the class consisting of the transparent vinyl compounds, the molecules of said sheet being substantially oriented, said sheet having a dichroic substance from the class consisting of the stains and dyes comprising iodine incorporated therewith.

7. A light polarizer comprising a sheet of material from the class consisting of the transparent vinyl compounds, the molecules of said sheet being substantially oriented, said sheet having a dichroic substance from the class consisting of the stains and dyes comprising a metal incorporated therewith.

8. A light polarizer comprising a sheet of material from the class consisting of the transparent vinyl compounds, the molecules of said sheet being substantially oriented, said sheet having a dichroic substance from the class consisting of the stains and dyes comprising a direct cotton dye incorporated therewith.

9. A light polarizer comprising a light-transmitting sheet of a material comprising a vinyl acetal resin, the molecules of said sheet being substantially oriented, said sheet having a dichroic substance from the class consisting of the stains and dyes incorporated therewith.

10. A light polarizer comprising a light-transmitting sheet of a material comprising a vinyl acetal resin, said sheet having a dichroic substance from the class consisting of the stains and dyes incorporated therewith and having its molecules so oriented that the angle between the directions of monochroism within said sheet is greater than 165°.

11. A light polarizer comprising a light-transmitting sheet of a material comprising a vinyl acetal resin, said sheet having a dichroic substance from the class consisting of the stains and dyes incorporated therewith and having its molecules so oriented that the dichroic ratio of said sheet for the wavelengths of light for which it is dichroic is at least 9.

12. A light polarizer comprising a light-transmitting sheet of a material comprising a vinyl acetal resin, said sheet having a dichroic substance from the class consisting of the stains and dyes incorporated therewith and having its molecules so oriented that the dichroic ratio of said sheet for the wavelengths of light for which it is dichroic is at least 9, said sheet absorbing at least 98% of one component of incident light of said wavelengths.

13. A light polarizer comprising a light-transmitting sheet of a material comprising a vinyl acetal resin, the molecules of said sheet being substantially oriented, said sheet having a dichroic substance from the class consisting of the stains and dyes comprising an element incorporated therewith.

14. A light polarizer comprising a light-transmitting sheet of a material comprising a vinyl acetal resin, the molecules of said sheet being substantially oriented, said sheet having a dichroic substance from the class consisting of the stains and dyes comprising iodine incorporated therewith.

15. A light polarizer comprising a light-transmitting sheet of a material comprising a vinyl acetal resin, the molecules of said sheet being substantially oriented, said sheet having a dichroic substance from the class consisting of the stains and dyes comprising a metal incorporated therewith.

16. A light polarizer comprising a light-transmitting sheet of a material comprising a vinyl acetal resin, the molecules of said sheet being substantially oriented, said sheet having a dichroic substance from the class consisting of the stains and dyes comprising a direct cotton dye incorporated therewith.

17. A light polarizer comprising a sheet of molecularly oriented, transparent polyvinyl butyral having a dichroic substance from the class consisting of the stains and dyes incorporated therewith.

18. A light polarizer comprising a sheet of molecularly oriented, transparent polyvinyl butyral having a dichroic substance from the class consisting of the stains and dyes comprising iodine incorporated therewith.

19. A light polarizer comprising a sheet of molecularly oriented, transparent polyvinyl butyral having a dichroic substance from the class consisting of the stains and dyes incorporated therewith, the angles of monochroism within said sheet being greater than 165°.

20. The process of making a light polarizer, comprising extending a rubbery-elastic sheet of a transparent, linear, high polymeric plastic material of the class consisting of the vinyl compounds until the molecules thereof are substantially oriented, setting said sheet in oriented condition, and at one stage of said process rendering said sheet dichroic by applying thereto a dichroic stain comprising iodine.

21. The process of forming a polarizer, which comprises rendering a sheet of a vinyl compound rubber-elastic, extending said sheet substantially to the limit of extension of its rubber-elastic state while it is in said state, setting said sheet in said extended condition, and dyeing said sheet at one step in the process with a material forming a dichroic stain in said sheet.

22. A light-polarizing, plastic sheet comprising a vinyl compound having a dichroic substance from the class consisting of the stains and dyes incorporated therewith, said sheet being under substantially uniform, internal, linear strain in a predetermined direction parallel to the plane of the surface thereof, the molecules of said sheet being substantially oriented parallel to said predetermined direction, said sheet being characterized by that fact that it will contract in a direction substantially parallel to said first-named direction if said strain is released.

23. A light-polarizing sheet comprising a transparent vinyl acetal resin having a dichroic substance from the class consisting of the stains and dyes incorporated therewith, said sheet being under substantially uniform, internal, linear strain in a predetermined direction parallel to the plane of the surface thereof, the molecules of said sheet being substantially oriented parallel to said predetermined direction, said sheet being characterized by that fact that it will contract in a direction substantially parallel to said first-named direction if said strain is released.

24. A light-polarizing, plastic sheet comprising a vinyl compound having a dichroic substance from the class consisting of the stains and dyes comprising iodine incorporated therewith, said sheet being under substantially uniform, internal, linear strain in a predetermined direction parallel to the plane of the surface thereof, the molecules of said sheet being substantially oriented parallel to said predetermined direction, said sheet being characterized by that fact that it will contract in a direction substantially parallel to said first-named direction if said strain is released.

25. A light-polarizing sheet comprising a transparent vinyl acetal resin having a dichroic substance from the class consisting of the stains and dyes comprising iodine incorporated therewith, said sheet being under substantially uniform, internal, linear strain in a predetermined direction parallel to the plane of the surface thereof, the molecules of said sheet being substantially oriented parallel to said predetermined direction, said sheet being characterizd by that fact that it will contract in a direction substantially parallel to said first-named direction if said strain is released.

EDWIN H. LAND.